Dec. 10, 1963  G. E. BONIN  3,113,406
FLEXIBLE HONE
Filed Jan. 16, 1962
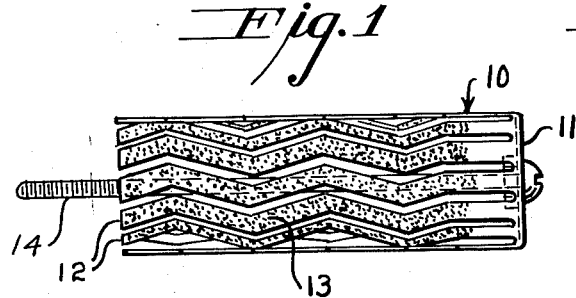
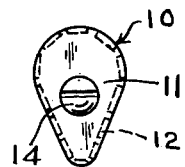
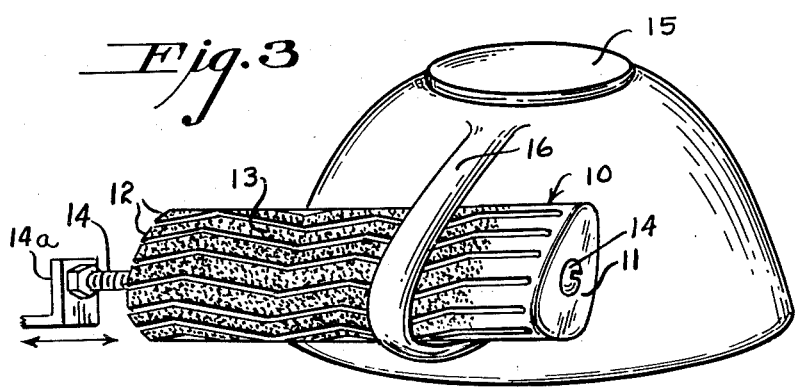
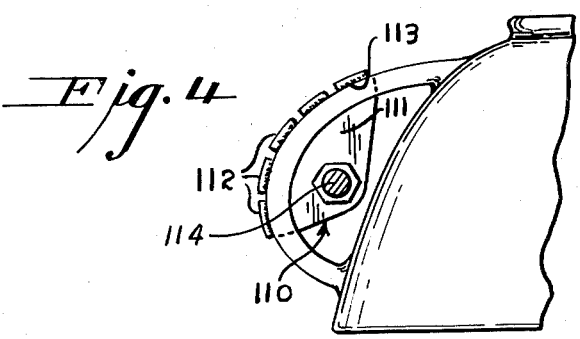
INVENTOR.
GEORGE E. BONIN
BY Clarence R. Patty Jr.
ATTORNEY 3,113,406
FLEXIBLE HONE
George E. Bonin, Addison, N.Y., assignor to Corning Glass Works, Corning, N.Y., a corporation of New York
Filed Jan. 16, 1962, Ser. No. 166,593
6 Claims. (Cl. 51—185)

This invention relates to a flexible hone and more particularly to a mechanically oscillatable and expandable abrasive tool for enlarging holes or recesses and removing parting lines to produce controlled finishes without necessitating the utilization of pyro or thermo applications.

In the manufacture of articles from the rather recently developed class of materials known as glass ceramics, various problems have arisen which are peculiar to this family of materials. For example, in using a split mold for pressing an article such as a cup, from a glass ceramic composition, a parting line is formed during the pressing operation similar to that which is produced when forming the similar article out of glass. However, whereas, in the case of a glass article the parting line may be conveniently removed by fire polishing and subsequently annealing to remove any internal stresses which may have been set up, in the case of a glass ceramic a fire polish would tend to partially ceram or predevitrify a localized area of the initially formed glass-like article resulting in breakage during the regular cerramming or crystallizing process.

Since the conventional fire polishing methods would not feasibly remove the parting lines on articles formed from glass ceramic materials, I set forth to devise a novel device which would overcome and solve this problem peculiar to the family of materials known as glass ceramics. The abrasive pencil-type tool was tried; however, it was found that such tool is not readily adapted for automation and requires an expensive, tedious, and time-consuming manual operation which renders it virtually useless for commercial application. After extended research and experimentation, I devised a novel honing tool having a plurality of abrasive-coated flexible blades preformed to the general contour of the workpiece and found that it not only provided excellent results but was easily adapted to automation by merely connecting it to a reciprocating arm.

It thus has been an object of my invention to provide a novel device which eliminates the problem heretofore encountered in the removal of parting lines and the like from articles formed of glass ceramic materials.

A further object of my invention has been to provide an improved honing tool having a plurality of substantially interlocking abrasive coated blades which flexibly conform to the counter of the workpiece.

An additional object of my invention has been to provide a flexible hone, adapted for reciprocating automation, which efficiently removes parting lines and the like from articles formed of glass ceramic materials without producing a detrimental effect to the composition such as is occasioned with conventional pyro applications.

These and other objects of my invention will be apparent to those skilled in the art from the following disclosure and accompanying drawings in which:

FIGURE 1 is a side elevational view of a flexible hone embodying my invention.

FIGURE 2 is an end elevational view of the device shown in FIGURE 1;

FIGURE 3 illustrates the application of the device shown in FIGURE 1 for removing internal parting lines formed about the handle of a cup; and FIGURE 4 is an end view of an additional embodiment of a flexible hone encompassing my invention, which may be utilized to remove exterior parting lines and the like formed on a curvilinear surface such as the handle of a cup.

Referring now to FIGURES 1 and 2, a hone 10 is shown comprising an end portion 11 having a plurality of longitudinally extending complementary or interlocking zig-zag blades 12 formed integral with and emanating from the periphery of the base portion 11. The outer surfaces of the blades 12 are provided with a suitable long-wearing abrasive coating 13 such as a diamond or silicon carbide coating. Suitable means, such as a bolt 14, is provided for connecting the end portion 11 to a reciprocating arm 14a of a suitable automatic power supply.

The zig-zag or tortuous path formed in the blades 12 insures complete coverage and surface contact with the workpiece, so that a smooth surface finish may be achieved by simple reciprocating motion, without the necessity of imparting rotational movement to the tool. When attempting to utilize a hone having blades with a simple spiral configuration, I found that ridges were left in the workpiece. The multiple blades diverge slightly as they extend outwardly from the end portion 11, in order to impart the necessary flexibility to the device so that it will fully conform to the contour of the workpiece. I found that a continuous tool does not possess the required flexibility, and only makes random contact with the workpiece, thus rendering it inoperative and unexceptable for the purpose intended.

As shown in FIGURE 2, it is preferable to preshape the interior or peripheral configuration of the end portion 11 so that the blades are of the general contour of the workpiece to be finished. For the sake of simplicity, the normally outwardly expanded or flexed divergent blades 12 are shown as exactly following the contour of the periphery of end portion 11.

Referring now to FIGURE 3, the operation of a device shown in FIGURES 1 and 2 is illustrated in connection with the removal of parting lines formed on the inside of a cup handle. A cup 15, having a handle 16, is shown having the hone 10 positioned for reciprocating motion within the interior of the handle 16. Although the end portion 11 is preformed to the general internal contour of the handle, the outwardly expanded flexible zig-zag blades 12 insure complete contact with the inner surface of the handle portion to completely remove the parting line formed thereabout and provide a controlled finish thereon.

FIGURE 4 illustrates a honing tool, similar to that shown in FIGURES 1 through 3, but designed to remove a parting line or the like on the exterior of a curvilinear surface of a glass ceramic article, such as the exterior of a cup handle. The tool 110 comprises a base portion 111 having a plurality of longitudinally extending complementary or interlocking blade portions 112 formed integral therewith and emanating from a concave-convex peripheral edge portion thereof. The interior surface of the blade portions 112 are provided with a suitable long-wearing abrasive material 113 such as a diamond coating or silicon carbide coating. In order to facilitate automatic reciprocation of the tool 110, suitable means such as bolt 114 is secured to end portion 111 for connecting the tool to a reciprocating arm (not shown) of a suitable power source. The tool 110, like the honing tool 10 is preformed to the general contour of the workpiece to be finished and operates in a manner similar to that described for the tool 10.

Although I have disclosed the now preferred embodiments of my invention, it will be apparent to those skilled in the art that various changes and modifications may be made thereto without departing from the spirit and scope of the invention as defined in the appended claims.

I claim:
1. An improved flexible hone for removing parting lines and the like from the exterior of a curvilinear surface formed of glass ceramic-like material comprising an end portion having a concavo-convex peripheral portion preformed to the general configuration of the exterior curvilinear surface to be finished, a plurality of spaced apart zig-zag blade-like members extending outwardly said peripheral portion to complement said preformed configuration, a long-wearing abrasive coating formed on the inner surface of said blade-like members, and means secured to said end portion for connecting a reciprocating arm to said flexible hone so that said hone may be mechanically reciprocated in contact with the surface to be finshed.

2. An improved flexible hone as defined in claim 1 wherein said long-lasting abrasive coating is a diamond coating material.

3. An improved tool for removing parting lines and the like from articles formed of glass ceramic material without detrimentally effecting the structure thereof comprising, an end portion having an outer periphery preformed to the general contour of the article to be finished, a plurality of substantially rigid and self-supporting longitudinally extending zig-zag blades emanating from the peripheral portion of said end portion, said zig-zag blades providing a configuration such that a straight line perpendicular to an end face of said end portion may intersect two adjacent blades more than once along the length of the blades, and an abrasive coating applied to the operating surfaces of said longitudinally extending zig-zag blades.

4. An improved hone for removing parting lines and the like from articles formed of ceramic-like materials comprising, a plurality of substantially rigid spaced-apart longitudinally extending blade-like members, a disk-like end member having an outer periphery preformed to the general contour of the surface to be finished, said blade-like members flexibly mounted about a peripheral portion of said end member to substantially complement the preformed configuration thereof, said blade-like member forming a torturous path along their longitudinal extent such that a straight line extending perpendicular to an end face of said end member may intersect two adjacent blade-like members more than once along their longitudinal extent, and an abrasive coating formed on the operating surface of said blade-like members.

5. An improved flexible hone for finishing irregular surface portions of an article formed of ceramic-like material comprising, an end portion having an exterior configuration formed to the general contour of the surface to be finished, a plurality of self-supporting longitudinally extending spaced-apart complementary blades suspended at one end from said end portion, said blades extending flexibly outwardly from a surface of said end portion adjacent a peripheral edge thereof so as to substantially complement the contour of said end portion along their longitudinal extent, said blades forming zig-zag paths within the contour of such complemental portion along their longitudinal extent such that a straight line perpendicular to an end face of said end portion may intersect two adjacent blades more than once along their extent, and an abrasive coating formed on the operating surfaces of said blades.

6. An improved flexible hone for removing parting lines and the like from curvilinear surfaces formed of glass ceramic-like materials comprising, an end portion preformed to the general configuration of the curvilinear surface to be finished, a plurality of substantially rigid spaced-apart blade-like members being self-supporting and extending outwardly from a surface of said end portion adjacent a peripheral edge thereof so as to continue the preformed contour of said end portion along the extent of said blade-like members, said blade-like members having a zig-zag configuration such that a straight line extending perpendicular to an end face of said end portion may intersect two adjacent blade-like members more than once along the length of such members, said blade-like members being flexibly mounted at said one end so that they may conform to the curvilinear surface to be finished, and a long-wearing abrasive coating formed on the operating surfaces of said blade-like members.

References Cited in the file of this patent

UNITED STATES PATENTS

| | | |
|---|---|---|
| 2,021,150 | Leonard | Nov. 19, 1935 |
| 2,282,650 | Fenton | May 12, 1942 |

FOREIGN PATENTS

| | | |
|---|---|---|
| 481,469 | France | Dec. 8, 1916 |
| 606,227 | France | June 9, 1926 |